United States Patent
Zufall (10) Patent No.: US 12,483,959 B2
(45) Date of Patent: Nov. 25, 2025

(54) SYSTEM AND METHOD FOR PREDICTIVE INTER-CARRIER HAND-OFF TO MITIGATE PROBLEMATIC COVERAGE AREAS

(71) Applicant: DISH Wireless L.L.C., Englewood, CO (US)

(72) Inventor: David Zufall, Lone Tree, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 370 days.

(21) Appl. No.: 18/189,984

(22) Filed: Mar. 24, 2023

(65) Prior Publication Data

US 2024/0056934 A1    Feb. 15, 2024

Related U.S. Application Data (60) Provisional application No. 63/396,512, filed on Aug. 9, 2022.

(51) Int. Cl.
  *H04W 36/32*   (2009.01)
  *H04W 36/30*   (2009.01)

(52) U.S. Cl.
  CPC ......... *H04W 36/32* (2013.01); *H04W 36/305* (2018.08)

(58) Field of Classification Search
  CPC ............... H04W 36/32; H04W 36/305; H04W 36/008375; H04W 24/02
  USPC .......................................................... 370/331
  See application file for complete search history.

(56) References Cited

U.S. PATENT DOCUMENTS

| | | | | |
|---|---|---|---|---|
| 6,611,506 B1* | 8/2003 | Huang | ................... | H04W 72/52 370/332 |
| 7,742,453 B1* | 6/2010 | Goyal | ..................... | H04W 8/30 370/335 |
| 2004/0106412 A1* | 6/2004 | Laroia | ................... | H04W 72/51 370/320 |

(Continued)

OTHER PUBLICATIONS

"3rd Generation Partnership Project; Technical Specification Group Radio Access Network; NG-RAN; Architecture description (Release 16)," Technical Specification, 3GPP TS 38.401 V16.8.0, Dec. 2021, 79 pages.

*Primary Examiner* — Khaled M Kassim
*Assistant Examiner* — Oladiran Gideon Olaleye
(74) *Attorney, Agent, or Firm* — Seed Intellectual Property Law Group LLP (57) ABSTRACT

Embodiments are directed towards systems and methods for a system for predictive inter-carrier hand-off to mitigate problematic coverage areas. One such method includes: training a machine learning model using the consolidating user data regarding dropped calls of the end user mobile devices and network problems from data logs as training data; analyzing the user data, using the machine learning model, to determine geographical areas in which repetitive dropped calls of the end user mobile devices or network problems have been identified; predicting, as an output from the machine learning model, future dropped calls of the end user mobile devices and network problems in identified geographical areas; analyzing alternative available carriers or roaming partners to determine whether they have superior service for end user mobile devices in the identified geographical areas; and initiating inter-carrier hand-off of an end user mobile device to another carrier or roaming partner.

20 Claims, 7 Drawing Sheets

(56) References Cited

U.S. PATENT DOCUMENTS

| | | | |
|---|---|---|---|
| 2011/0009149 A1* | 1/2011 | Chen | H04W 36/0072 455/517 |
| 2018/0192303 A1* | 7/2018 | Hui | H04M 3/2227 |
| 2022/0408411 A1* | 12/2022 | Vivanco | H04W 52/0261 |
| 2023/0319665 A1* | 10/2023 | Zhou | H04W 36/00692 370/332 |

* cited by examiner

SYSTEM AND METHOD FOR PREDICTIVE INTER-CARRIER HAND-OFF TO MITIGATE PROBLEMATIC COVERAGE AREAS

BACKGROUND

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of Fifth Generation (5G) wireless technology has resulted in faster speeds and increased bandwidth. Thus, minimizing interruptions in the supporting networking infrastructure is important to providing a resilient and stable network with the desired end-to-end performance. It is with respect to these and other considerations that the embodiments described herein have been made.

In some types of 5G network architecture, multiple 5G Cores are connected to a central database that manages subscriber information. During operation of the 5G network, there may be occasions when a 5G end user mobile device experiences dropped calls or other types of poor network coverage on their network carrier. Network carriers are constantly looking for ways to improve their network performance and minimize call dropping; however, these issues are never completely overcome. Thus, a full solution to these end user experience problems of dropped calls and other types of poor network coverage has yet to be produced. The present disclosure addresses this and other issues.

BRIEF SUMMARY

The present disclosure relates generally to telecommunication networks, more particularly, to a system and method for predictive inter-carrier hand-off to mitigate problematic coverage areas.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible, and virtual RAN with interfaces creating additional data access points.

5G network functions may be completely software-based and designed as cloud-native, meaning that they're agnostic to the underlying cloud infrastructure, allowing higher deployment agility and flexibility.

With the advent of 5G, industry experts defined how the 5G Core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in Telecommunications that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which leverages IT development principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open-source development, ultimately to ease the deployment of new features and technology with scale. The O-RAN ALLIANCE objective is to allow multi-vendor deployment with off-the-shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises a set of radio base stations (each known as Next Generation Node B (gNB)) connected to the 5G Core (5GC) and to each other. The gNB incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called microservices.

Briefly stated, one or more methods for predictive inter-carrier hand-off to mitigate problematic coverage areas are disclosed. Some such methods include: providing, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; consolidating user data regarding dropped calls of end user mobile devices and network problems from data logs; training a machine learning model using the consolidating user data regarding dropped calls of the end user mobile devices and network problems from data logs as training data; analyzing the user data, using the machine learning model, to determine geographical areas in which repetitive dropped calls of the end user mobile devices or network problems have been identified; predicting, as an output from the machine learning model, future dropped calls of the end user mobile devices and network problems in identified geographical areas; analyzing one or more alternative available carriers or roaming partners to determine whether they have superior service for end user mobile devices in the identified geographical areas; and initiating inter-carrier hand-off of an end user mobile device to one of the one or more alternative available carriers or roaming partners to prevent a dropped call by the end user mobile device or other negative network service experience by the end user, if the one of the one or more alternative available carriers or roaming partners is determined to have superior service for the end user mobile devices in the identified geographical areas.

In some embodiments of the methods for predictive inter-carrier hand-off to mitigate problematic coverage areas, the method further includes: analyzing the user data, using the machine learning model, to determine geographical areas, times of day, network load, and device characteristics in which repetitive dropped calls of the end user mobile devices and network problems have been identified. In another aspect of some embodiments, the geographical areas in which the inter-carrier hand-off is initiated includes geographical areas at least partially away from edges of the network carrier coverage. In still another aspect of some embodiments, the consolidated user data is continuously updated with new data regarding dropped calls of the end user mobile devices and network problems, and wherein the training of the machine learning model is continuously updated with the new data regarding dropped calls and network problem.

In yet another aspect of some embodiments, the predicted future dropped calls and network problems in identified geographical areas are on only one of voice service and data service, and wherein the initiating of inter-carrier hand-off to another carrier or roaming partner is only on one of voice service and data service, and the other of voice service and data service remains with the initial carrier. Also, in one or more aspects of some embodiments, the superior service in the identified geographical areas is optimized for one or more of availability, performance, or never dropping a call of the end user mobile device. Furthermore, in some embodiments, the primary data relied upon to determine which network carrier has superior performance is not signal strength. In another aspect of some embodiments, the end user mobile device uses a dual SIM, dual standby configuration that enables the inter-carrier hand-off of an end user mobile device to be from the network carrier of the first SIM to the network carrier of the second SIM. In some embodiments, the method further includes: enabling the end user mobile device to initiate the network carrier hand-off. In still other aspects of some embodiments, the consolidated user data includes service calls from users and customer complaints for users.

In other embodiments, one or more systems for predictive inter-carrier hand-off to mitigate problematic coverage areas are disclosed. The system includes a memory that stores computer executable instructions; and a processor that executes the computer executable instructions to: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; consolidate user data regarding dropped calls of end user mobile devices and network problems from data logs; train a machine learning model using the consolidating user data regarding dropped calls of the end user mobile devices and network problems from data logs as training data; analyze the user data, using the machine learning model, to determine geographical areas in which repetitive dropped calls of the end user mobile devices or network problems have been identified; predict, as an output from the machine learning model, future dropped calls of the end user mobile devices and network problems in identified geographical areas; analyze one or more alternative available carriers or roaming partners to determine whether they have superior service for end user mobile devices in the identified geographical areas; and initiate inter-carrier hand-off of an end user mobile device to one of the one or more alternative available carriers or roaming partners to prevent a dropped call by the end user mobile device or other negative network service experience by the end user, if the one of the one or more alternative available carriers or roaming partners is determined to have superior service for the end user mobile devices in the identified geographical areas.

In some embodiments of the system for predictive inter-carrier hand-off to mitigate problematic coverage areas, the user data is analyzed, using the machine learning model, to determine geographical areas, times of day, network load, and device characteristics in which repetitive dropped calls of the end user mobile devices and network problems have been identified. In another aspect of some embodiments, the geographical areas in which the inter-carrier hand-off is initiated include geographical areas at least partially away from edges of the network carrier coverage. In still another aspect of some embodiments, the consolidated user data is continuously updated with new data regarding dropped calls of the end user mobile devices and network problems, and wherein the training of the machine learning model is continuously updated with the new data regarding dropped calls and network problem.

In yet another aspect of some embodiments, the predicted future dropped calls and network problems in identified geographical areas are on only one of voice service and data service, and wherein the initiating of inter-carrier hand-off to another carrier or roaming partner is only on one of voice service and data service, and the other of voice service and data service remains with the initial carrier. Also, in one or more aspects of some embodiments, the superior service in the identified geographical areas is optimized for one or more of availability, performance, or never dropping a call of the end user mobile device. Furthermore, in some embodiments, the primary data relied upon to determine which network carrier has superior performance is not signal strength. In another aspect of some embodiments, the end user mobile device uses a dual SIM, dual standby configuration that enables the inter-carrier hand-off of an end user mobile device to be from the network carrier of the first SIM to the network carrier of the second SIM. In some embodiments, the end user mobile device is enabled to initiate the network carrier hand-off. In still other aspects of some embodiments, the consolidated user data includes service calls from users and customer complaints for users.

Additionally, in other embodiments, one or more non-transitory computer-readable storage mediums are disclosed. The one or more non-transitory computer-readable storage mediums have computer-executable instructions stored thereon that, when executed by a processor, cause the processor to: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; consolidate user data regarding dropped calls of end user mobile devices and network problems from data logs; train a machine learning model using the consolidating user data regarding dropped calls of the end user mobile devices and network problems from data logs as training data; analyze the user data, using the machine learning model, to determine geographical areas in which repetitive dropped calls of the end user mobile devices or network problems have been identified; predict, as an output from the machine learning model, future dropped calls of the end user mobile devices and network problems in identified geographical areas; analyze one or more alternative available carriers or roaming partners to determine whether they have superior service for end user mobile devices in the identified geographical areas; and initiate inter-carrier hand-off of an end user mobile device to one of the one or more alternative available carriers or roaming partners to prevent a dropped call by the end user mobile device or other negative network service experience by the end user, if the one of the one or more alternative available carriers or roaming partners is determined to have superior service for the end user mobile devices in the identified geographical areas.

In some embodiments, the non-transitory computer-readable storage medium for predictive inter-carrier hand-off to mitigate problematic coverage areas, further includes: analyzing the user data, using the machine learning model, to determine geographical areas, times of day, network load, and device characteristics in which repetitive dropped calls of the end user mobile devices and network problems have been identified. In another aspect of some embodiments, the geographical areas in which the inter-carrier hand-off is initiated includes geographical areas at least partially away from edges of the network carrier coverage. In still another aspect of some embodiments, the consolidated user data is continuously updated with new data regarding dropped calls of the end user mobile devices and network problems, and wherein the training of the machine learning model is continuously updated with the new data regarding dropped calls and network problem.

In yet another aspect of some embodiments, the predicted future dropped calls and network problems in identified geographical areas are on only one of voice service and data service, and wherein the initiating of inter-carrier hand-off to another carrier or roaming partner is only on one of voice service and data service, and the other of voice service and data service remains with the initial carrier. Also, in one or more aspects of some embodiments, the superior service in the identified geographical areas is optimized for one or more of availability, performance, or never dropping a call of the end user mobile device. Furthermore, in some embodiments, the primary data relied upon to determine which network carrier has superior performance is not signal strength. In another aspect of some embodiments, the end user mobile device uses a dual SIM, dual standby configuration that enables the inter-carrier hand-off of an end user mobile device to be from the network carrier of the first SIM to the network carrier of the second SIM. In still another aspect of some embodiments, the non-transitory computer-readable storage medium further includes: enabling the end user mobile device to initiate the network carrier hand-off. In still other aspects of some embodiments, the consolidated user data includes service calls from users and customer complaints for users.

Further, one or more other methods for predictive inter-carrier hand-off to mitigate problematic coverage areas are disclosed. Some such methods include: consolidating user data regarding dropped calls of end user mobile devices and network problems from data logs; training a machine learning model using the consolidating user data regarding dropped calls of the end user mobile devices and network problems from data logs as training data; analyzing the user data, using the machine learning model, to determine geographical areas in which repetitive dropped calls of the end user mobile devices or network problems have been identified; predicting, as an output from the machine learning model, future dropped calls of the end user mobile devices and network problems in identified geographical areas; and initiating inter-carrier hand-off of an end user mobile device to one of the one or more alternative available carriers or roaming partners to prevent a dropped call by the end user mobile device or other negative network service experience by the end user.

In other embodiments, one or more additional systems for predictive inter-carrier hand-off to mitigate problematic coverage areas are disclosed. The system includes a memory that stores computer executable instructions; and a processor that executes the computer executable instructions to: consolidate user data regarding dropped calls of end user mobile devices and network problems from data logs; train a machine learning model using the consolidating user data regarding dropped calls of the end user mobile devices and network problems from data logs as training data; analyze the user data, using the machine learning model, to determine geographical areas in which repetitive dropped calls of the end user mobile devices or network problems have been identified; predict, as an output from the machine learning model, future dropped calls of the end user mobile devices and network problems in identified geographical areas; and initiate inter-carrier hand-off of an end user mobile device to one of the one or more alternative available carriers or roaming partners to prevent a dropped call by the end user mobile device or other negative network service experience by the end user.

Moreover, in still other embodiments, one or more non-transitory computer-readable storage mediums are disclosed. The one or more non-transitory computer-readable storage mediums have computer-executable instructions stored thereon that, when executed by a processor, cause the processor to: consolidate user data regarding dropped calls of end user mobile devices and network problems from data logs; train a machine learning model using the consolidating user data regarding dropped calls of the end user mobile devices and network problems from data logs as training data; analyze the user data, using the machine learning model, to determine geographical areas in which repetitive dropped calls of the end user mobile devices or network problems have been identified; predict, as an output from the machine learning model, future dropped calls of the end user mobile devices and network problems in identified geographical areas; and initiate inter-carrier hand-off of an end user mobile device to one of the one or more alternative available carriers or roaming partners to prevent a dropped call by the end user mobile device or other negative network service experience by the end user.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, and the like. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
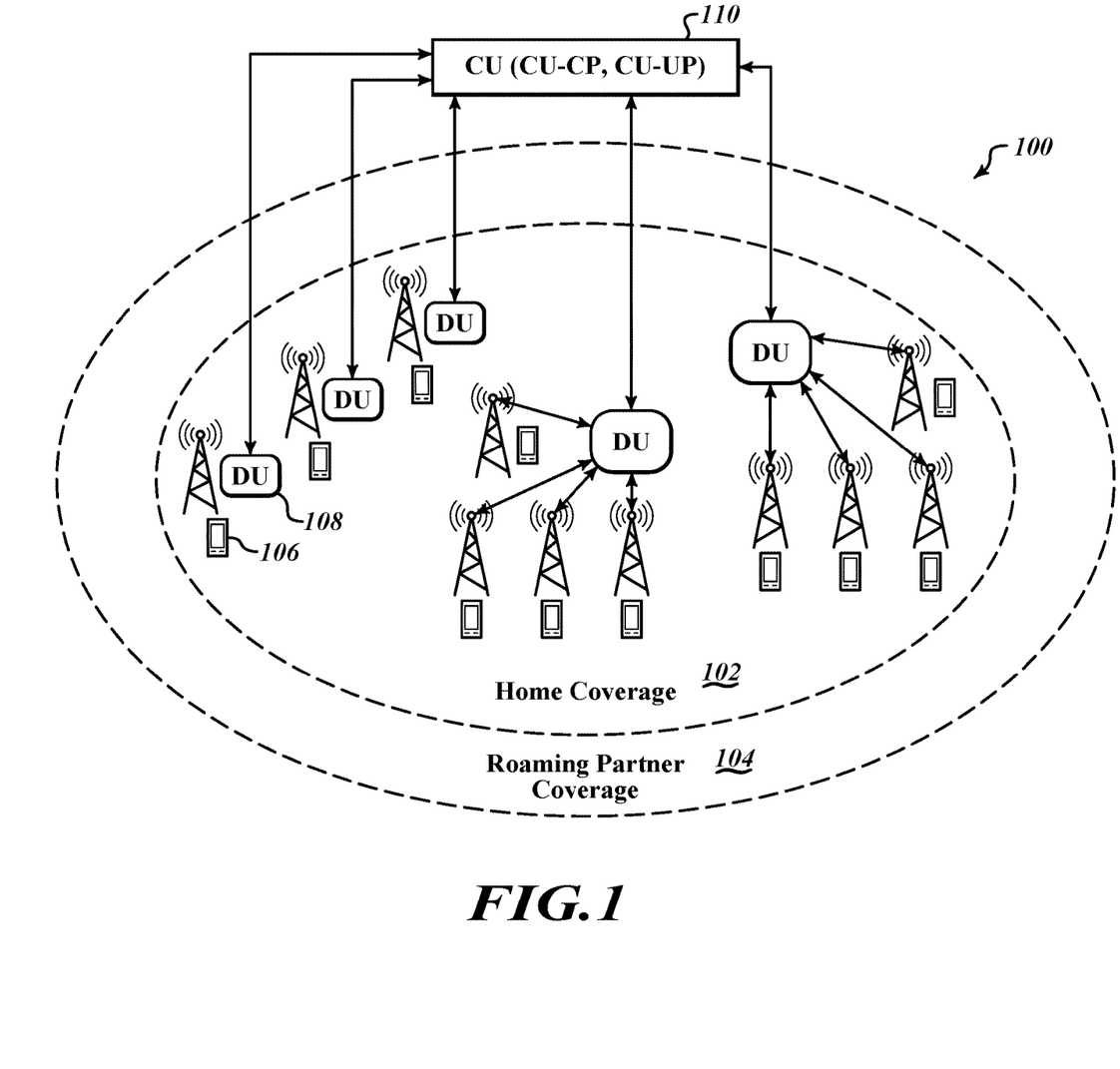
FIG. 1 illustrates a context diagram of an environment in which a system for predictive inter-carrier hand-off to mitigate problematic coverage areas may be implemented in accordance with embodiments described herein.

FIG. 1 illustrates a context diagram of an environment for a system for predictive inter-carrier hand-off to mitigate problematic coverage areas may be implemented in accordance with embodiments described herein.

A given area 100 will mostly be covered by two or more mobile network operators' wireless networks. Generally, mobile network operators have some roaming agreements that allow users to roam from home network to partner network under certain conditions, shown in FIG. 1 as home coverage area 102 and roaming partner coverage area 104. Operators may configure the mobile user's device, referred to herein as user equipment (UE), such as UE 106, with priority and a timer to stay on the home network coverage area 102 versus the roaming partner network coverage area 104. If a UE (e.g., UE 106) cannot find the home network coverage area 102, the UE will scan for a roaming network after a timer expiration (6 minutes, for example). This could have significant impact on customer experience in case of a catastrophic failure in the network. As shown in FIG. 1, a 5G RAN is split into DUs (e.g., DU 108) that manage scheduling of all the users and a CU that manages the mobility and radio resource control (RRC) state for all the UEs. The RRC is a layer within the 5G NR protocol stack. It exists only in the control plane, in the UE and in the gNB. The behavior and functions of RRC are governed by the current state of RRC. In 5G NR, RRC has three distinct states: RRC_IDLE, RRC_CONNECTED and RRC_INACTIVE.

Figure 2:
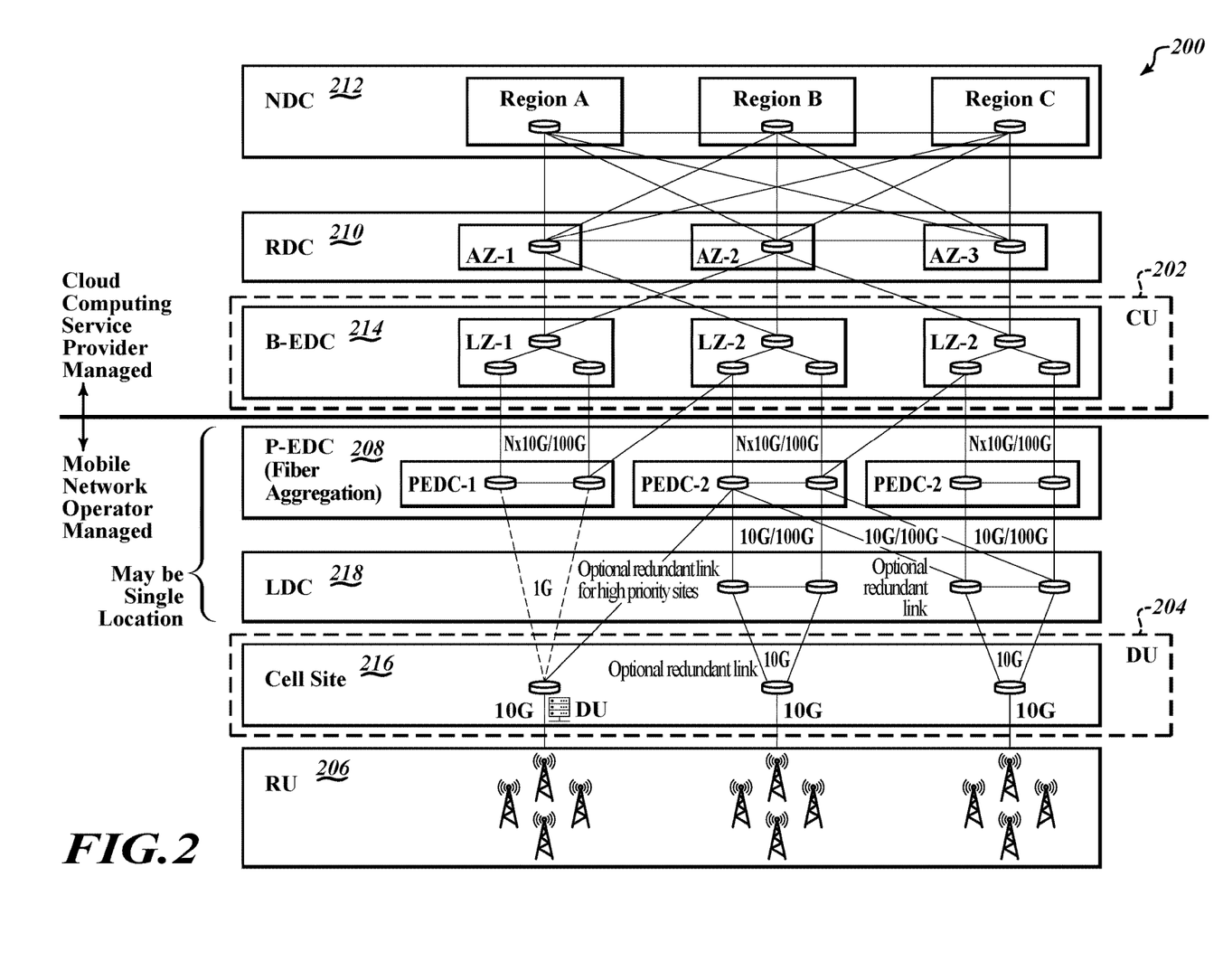
FIG. 2 illustrates a diagram of an example system architecture overview of a system in which the environment of FIG. 1 may be implemented in accordance with embodiments described herein.

FIG. 2 illustrates a diagram of an example system architecture overview of a system 200 in which the environment of FIG. 1 may be implemented in accordance with embodiments described herein.

As shown in FIG. 2, the radio unit (RU) 206 converts radio signals sent to and from the antenna into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNB functions, depending on the functional split option, and its operation is controlled by the CU 202.

The CU 202 is the centralized unit that runs the RRC and Packet Data Convergence Protocol (PDCP) layers. A gNB may comprise a CU and one DU connected to the CU via Fs-C and Fs-U interfaces for control plane (CP) and user plane (UP), respectively. A CU with multiple DUs will support multiple gNBs. The split architecture enables a 5G network to utilize different distribution of protocol stacks between CU 202 and DU 204 depending on mid-haul availability and network design. The CU 202 is a logical node that includes the gNB functions like transfer of user data, mobility control, RAN sharing, positioning, session management, etc., with the exception of functions that may be allocated exclusively to the DU 204. The CU 202 controls the operation of several DUs 204 over the mid-haul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or, as shown in FIG. 2, in a breakout edge data center (B-EDC) 214. As shown in FIG. 2, the DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

Figure 3:
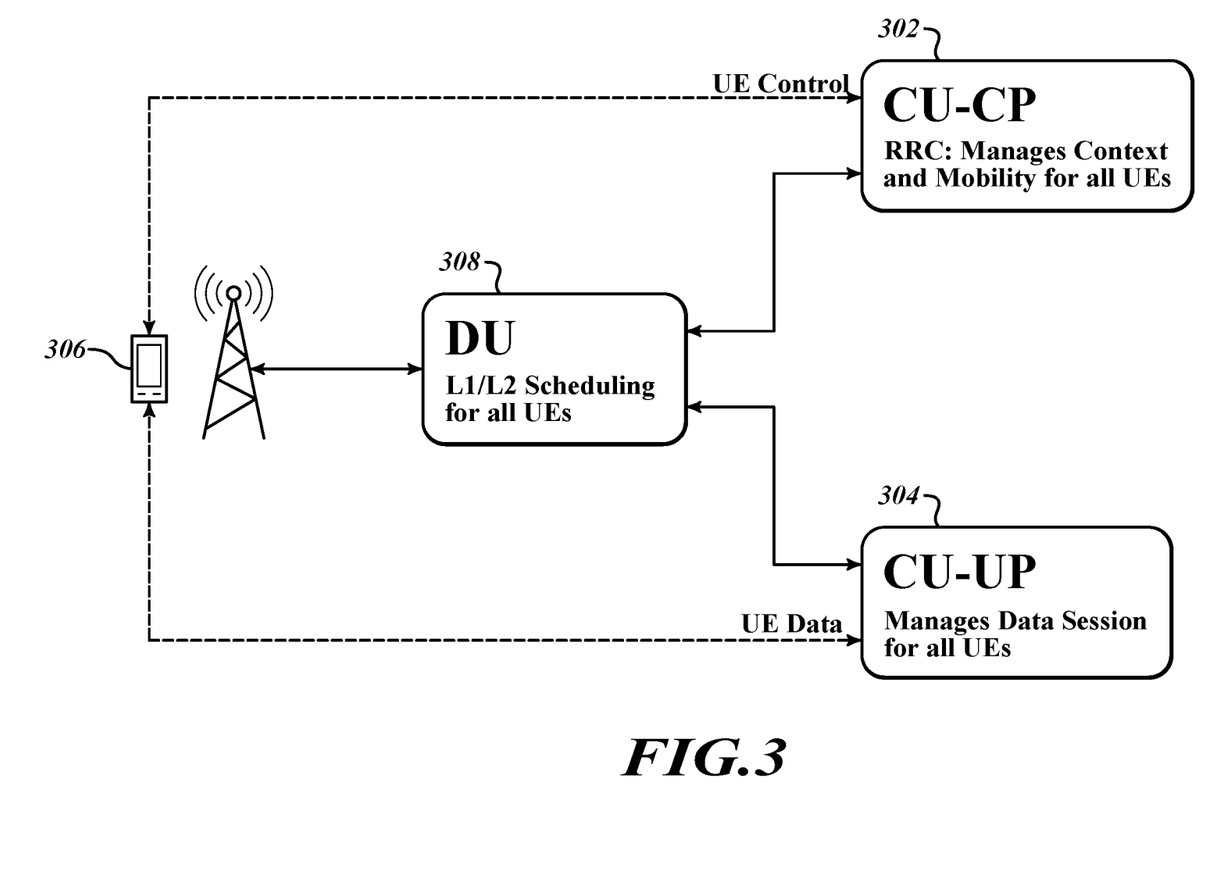
FIG. 3 illustrates a diagram showing connectivity between certain telecommunication network components during cellular telecommunication.

FIG. 3 is a diagram showing connectivity between certain telecommunication network components during cellular telecommunication in accordance with embodiments described herein.

The central unit control plane (CU-CP), for example of CU 110 of FIG. 1 or CU 202 of FIG. 2, primarily manages control processing of DUs, such as DU 308, and UEs, such as UE 302. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC. In 5G NR, RRC has three distinct states: RRC_IDLE, RRC_CONNECTED and RRC_INACTIVE. The CU-CP 302 terminates the E1 interface connected with the central unit user plane (CU-UP) 304 and the F1-C interface connected with the DU 308. The DU 308 maintains a constant heartbeat with CU 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

A virtual private cloud is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channels) per user. In some embodiments, this 5G network leverages the distributed nature of 5G cloud-native network functions and cloud flexibility, which optimizes the placement of 5G network functions for optimal performance based on latency, throughput and processing requirements.

In some embodiments, the network architecture utilizes a logical hierarchical architecture consisting of National Data Centers (NDCs), Regional Data Centers (RDCs) and Breakout Edge Data Centers (BEDCs), to accommodate the distributed nature of 5G functions and the varying requirements for service layer integration. In one or more embodiments, BEDCs are deployed in Local Zones hosting 5G NFs that have strict latency budgets. They may also be connected with Pass-through Edge Data Centers (PEDC), which serve as an aggregation point for all Local Data Centers (LDCs) and cell sites in a particular market. BEDCs also provide internet peering for 5G data service.

In one or more embodiments, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic.

In some embodiments, the User Plane Function (Data Network Name (DNN)) is collocated in the BEDC, which anchors user data sessions and routes to the internet. In another aspect, the BEDCs leverage local internet access available in Local Zones, which allows for a better user experience while optimizing network traffic utilization.

In one of more embodiments, the Regional Data Centers (RDCs) are hosted in the Region across multiple availability zones. The RDCs host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, multiple RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs.

Cloud Native Functions (CNFs) deployed in the RDC utilize a high speed backbone to failover between AZs for application resiliency. CNFs like AMF and SMF, which are deployed in RDC, continue to be accessible from the BEDC in the Local Zone in case of an AZ failure. They serve as the backup CNF in the neighboring AZ and would take over and service the requests from the BEDC.

In this embodiment of the system for predictive inter-carrier hand-off to mitigate problematic coverage areas, dedicated VPCs are implemented for each Data Center type (e.g., local data center, breakout edge data center, regional data center, national data center, and the like). In some such embodiments, the national data center VPC stretches across multiple Availability Zones (AZs). In another aspect of some embodiments, two or more AZs are implemented per region of the cloud computing service provider.

Some embodiments of the 5G Core network functions require support for advanced routing capabilities inside VPC and across VPCs (e.g., UPF, SMF and ePDG). These functions rely on routing protocols such as BGP for route exchange and fast failover (both stateful and stateless). To support these requirements, virtual routers are deployed on EC2 to provide connectivity within and across VPCs, as well as back to the on-prem network.

Figure 4:
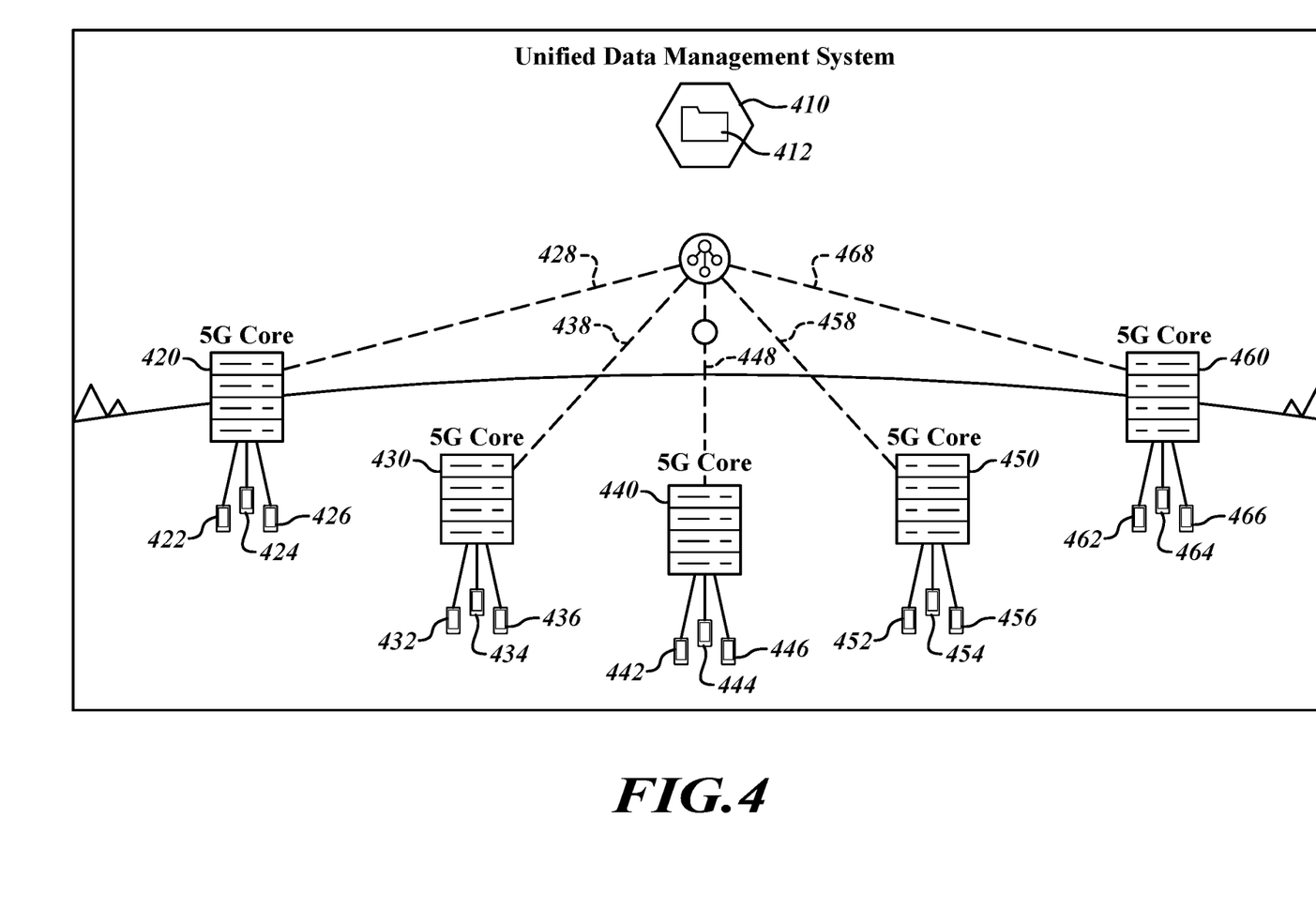
FIG. 4 illustrates a system that includes a central distributed subscriber database, a plurality of connected 5G Cores, and a plurality of end user mobile devices connected to each 5G Core.

FIG. 4 illustrates a system for predictive inter-carrier hand-off to mitigate problematic coverage areas that includes a Unified Data Management System 410, central distributed subscriber database 412, a plurality of connected 5G Cores 420, 430, 440, 450, and 460, and a plurality of end user mobile devices 422, 424, 426, 432, 434, 436, 442, 444, 446, 452, 454, 456, 462, 464, and 466. The central distributed subscriber database 412 is contained in the Unified Data Management System 410. The plurality of connected 5G Cores 420, 430, 440, 450, and 460 are each connected to the central distributed subscriber database 412 by connection lines 428, 438, 448, 458, and 468. The connection lines 428, 438, 448, 458, and 468 transmit voice and data information as well as control information, between the central distributed subscriber database 412 and the plurality of connected 5G Cores 420, 430, 440, 450, and 460. Additionally, the plurality of end user mobile devices 422, 424, 426, 432, 434, 436, 442, 444, 446, 452, 454, 456, 462, 464, and 466 are each connected to their respective 5G Cores 420, 430, 440, 450, and 460. In some embodiments this is a direct connection, while in other embodiments, there are additional telephony components (e.g., base stations, antennas, receivers, and the like) that bridge the connection between the plurality of end user mobile devices 422, 424, 426, 432, 434, 436, 442, 444, 446, 452, 454, 456, 462, 464, and 466 that are each connected to their respective 5G Cores 420, 430, 440, 450, and 460.

Figure 5:
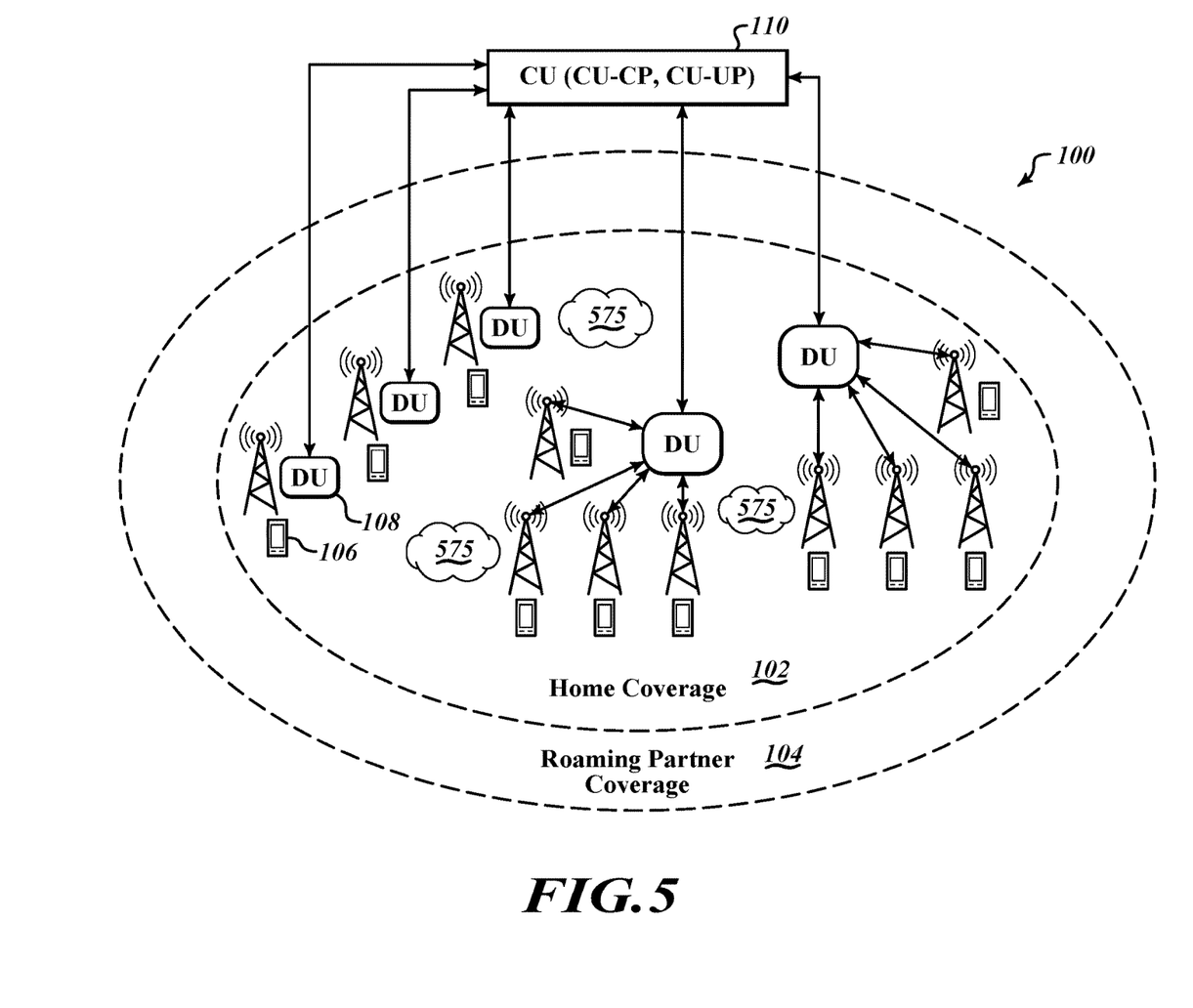
FIG. 5 illustrates a context diagram of a system for predictive inter-carrier hand-off to mitigate problematic coverage areas that shows identified call drop zones in the initiate carrier coverage area.

Referring now to FIG. 5, one or more embodiments of a 5G network architecture are shown that include a system for predictive inter-carrier hand-off to mitigate problematic coverage areas. In such an embodiment, end user mobile devices have experienced dropped calls or other network problems such as poor service. In some embodiments, the disclosed system consolidates user data regarding dropped calls of end user mobile devices and other network problems. This user data may include data logs, as well as service calls, customer complaints, or other data that has been generated or obtained by the carrier network. In some embodiments, this user data will be collected over as long a period of time as possible. In other embodiments, such as when a recent network upgrade has occurred, the user data may be collected and consolidated from the time and date of the upgrade to present.

Referring now to other aspects of the system for predictive inter-carrier hand-off to mitigate problematic coverage areas, this consolidated user data is then used as training data to train a machine learning model regarding dropped calls of the end user mobile devices and/or other network problems experienced by the end user. Next, the machine learning model analyzes the user data to determine geographical areas in which repetitive dropped calls of the end user mobile devices and/or other network problems experienced by the end user have been identified. This analysis of the training data by the machine learning model is then able to predict, as an output from the machine learning model, future dropped calls of the end user mobile devices and/or other network problems experienced by the end user in identified geographical areas. These identified geographical areas may be referred to predicted call drop zones 575 in the home network coverage area 102, as shown in FIG. 5. While these regions are referred to as predicted call drop zones 575, these regions may also include, or alternatively include, other identified network problems experienced by the end user, such as poor voice quality or data transfer without actual resulting in a dropped call.

Once the system has identified these predicted call drop zones 575, the system may analyze or compare one or more alternative available carriers or roaming partners to determine whether they have superior service for end user mobile devices in these identified geographical areas, i.e., predicted call drop zones 575. In some embodiments, the alternate carrier is a roaming partner that is used when an end user travels with its mobile device outside of its contracted coverage area. In other embodiments, the alternate carrier is not a roaming partner, but is a partner specifically for providing temporary service for these predicted call drop zones 575. In still other embodiments, there is more than one alternative available carrier and/or roaming partner to be selected from for providing coverage for these predicted call drop zones 575.

In some embodiments of the system for predictive inter-carrier hand-off to mitigate problematic coverage areas, this analysis of one or more alternative available carriers or roaming partners is performed by a machine learning model that is analyzing training data from the one or more alternative available carriers or roaming partners in a similar manner to the machine learning analysis performed for the end user's home carrier network. However, in some implementations, this training data regarding whether the one or more alternative available carriers or roaming partners have superior service for end user mobile devices in these identified geographical areas will not be available.

Thus, in some such implementations the system relies on coverage data provided by, or otherwise available from, the one or more alternative available carriers or roaming partners. In such situations, the analysis of the service for end user mobile devices in these identified geographical areas using the one or more alternative available carriers or roaming partners, may simply be a comparison against generalized coverage information provided by the one or more alternative available carriers or roaming partners to determine who is providing superior service at the predicted call drop zones 575. If more than one alternative available carrier or roaming partner is available to provide coverage at the predicted call drop zones 575, the system determines which of the alternative available carriers or roaming partners provides superior service, as well as if all of the alternative available carriers or roaming partners provide superior coverage over the home network coverage in the predicted call drop zones 575.

In some embodiments, if it is determined that one of the one or more alternative available carriers or roaming partners has superior service for the end user mobile devices in the identified geographical areas (i.e., predicted call drop zones 575), then the system initiates an inter-carrier hand-off of the end user mobile device to one of the one or more alternative available carriers or roaming partners to prevent a dropped call by the end user mobile device or other negative network service experience by the end user.

In other embodiments, the system or method of predictive inter-carrier hand-off to mitigate problematic coverage areas does not determine if the one or more alternative available carriers or roaming partners have superior service in the identified geographical areas. Instead, in such embodiments the system or method of predictive inter-carrier hand-off automatically initiates the inter-carrier hand-off of the end user mobile device to one of the one or more alternative available carriers or roaming partners without analyzing whether or not the one or more alternative available carriers or roaming partners have superior service in the identified geographical areas. There may by many reasons why this analysis element is not included in some embodiments of the predictive inter-carrier hand-off system and method, including by way of example only, and not by way of limitation, that the comparison data from the one or more alternative available carriers or roaming partners is not available or practically accessible.

In one or more embodiments of the system or method of predictive inter-carrier hand-off, the system determines that the end user mobile device is approaching a predicted call drop zone 575 using Global Positioning System (GPS), local positioning systems, or other inertial positioning systems. Such other inertial positioning systems include, by way of example only, and not by way of limitation: sensors such as cameras, LiDAR, radar, radios, and star trackers. In another aspect of some embodiments, the system initiates or otherwise receives the transfer back of the end user mobile device from the alternative available carrier or roaming partner, back to the home network carrier. Once again, the system may determine that the end user mobile device is exited the predicted call drop zone 575 using GPS or other positioning system.

Depending on the type of the predicted call drop zone, the regularity of the predicted call drop zone, and potential preferences of the network and the end user, the system may have an adjustable border region around the predicted call drop zone 575 that determines when the call hand-off to the alternative available carrier or roaming partner from the home carrier is commenced, and when the return call hand-off from the alternative available carrier or roaming partner to the home carrier is commenced. In some embodiments, the end user is enabled to adjust the width of the border region around the predicted call drop zone 575, with a thicker border region resulting in an earlier call hand-off and later return call hand-off. In other embodiments, the network is enabled to adjust the width of the border region around the predicted call drop zone 575, based on additional factors, such as network load on the home network, local weather conditions, and other relevant network conditions. Additionally, in still other embodiments, the system enables the end user mobile device to initiate the network carrier hand-off.

While in some embodiments described above, the machine learning model analyzes the user data only to determine predictable geographical areas (predicted call drop zone 575) where repetitive dropped calls of the end user mobile devices and network problems have occurred, in other embodiments, the machine learning model analyzes the user data to determine (1) predictable geographical areas, (2) predictable times of the day, week, or month; (3) predictable dates (holidays, sporting events, other events), (4) predictable network loads, and (5) predictable device characteristics where repetitive dropped calls of the end user mobile devices and network problems occur. In some situations, the geographical areas may be the primary driver of the repetitive dropped calls of the end user mobile devices (e.g., poor coverage due to high-rise building, geographical topography, electrical interference, other interference, and the like). In other situations, the geographical areas may not be the primary driver of the repetitive dropped calls of the end user mobile devices (e.g., poor coverage near a football stadium only occurs when the stadium is in use and the network is substantially over capacity). In still other situations, numerous factors lead to a predicted call drop zone 575, which include for example, a particular geographical area (e.g., on a stretch of highway), at a particular time period of day (e.g., rush hour(s) 5-7 pm), on particular days of the week (e.g., Monday through Friday), and on older model Apple devices. Thus, with sufficient user data, the machine learning model can determine as an output, predicted call drop zones 575 that are not just a geographical area, but also are time-specific, date-specific, and/or end user mobile device-specific.

Notably, some carrier networks will know where the outer edges exist of their coverage area and may take some type of measure to address coverage at the known edges of their coverage area. In contrast, the system and method for predictive inter-carrier hand-off to mitigate problematic coverage areas described herein provides a technological improvement and solution to a technological problem by addressing problematic repetitive call drop areas and poor network experience areas that are within the geographical areas of the network carrier coverage and at least partially away from edges of the network carrier coverage. Thus, the system and method for predictive inter-carrier hand-off identifies and predicts future dropped calls of the end user mobile devices and network problems in identified geographical areas that would be unknown without the predictive analysis by the machine learning model.

In one or more embodiments of the system and method for predictive inter-carrier hand-off, the consolidated user data is continuously updated with new data regarding dropped calls of the end user mobile devices and other network problems. In turn, the machine learning model is continuously updated due to its analysis of the newly received user data. Accordingly, the updated machine learning model then provides an updated prediction for future dropped calls of the end user mobile devices and other network problems in updated geographical areas. Thus, if some new event, device, or structure changes the user data with respect to dropped calls of the end user mobile devices or other network problems, the system provides continuously updating predictions of the predicted call drop zones 575.

In some embodiments of the system and method for predictive inter-carrier hand-off, the end user mobile devices use a Dual SIM (Subscriber Identity Module), Dual Standby architecture configuration. This type of Dual SIM architecture enables the end user mobile device to support two SIM cards. Some types of Dual-SIM Standby (DSS) devices require the user to specify which of the two SIMs is able to make and receive calls at a given time. Other more recent end user mobile devices employ Dual SIM, Dual Standby (DSDS) technology which enables these devices to have two active SIMs with only one transceiver. Notably, each SIM may connect to a separate network carrier. Accordingly, an end user mobile device with Dual SIM, Dual Standby technology may enable the inter-carrier hand-off of the end user mobile device to be from the network carrier of the first SIM to the network carrier of the second SIM when a predicted call drop zone 575 approaches. The Dual SIM, Dual Standby end user mobile device may also enable the inter-carrier hand-off of the end user mobile device back to the network carrier of the first SIM from the network carrier of the second SIM when the predicted call drop zone 575 has been passed.

In another aspect of one or more embodiments of the system and method for predictive inter-carrier hand-off, the end user mobile device uses a first carrier network for voice functionality and a second carrier for data functionality. In such an embodiment, the machine learning model may determine that predicted call drop zones 575 exist for voice functionality, data functionality, or both. Thus, in some embodiments of the system and method for predictive inter-carrier hand-off, the predicted future dropped calls and other network problems in identified geographical areas (i.e., predicted call drop zones 575) are on only voice functionality, not data functionality. In such a situation, the system initiates inter-carrier hand-off to another carrier or roaming partner only on the voice carrier network, but not the data carrier network. In other embodiments of the system and method for predictive inter-carrier hand-off, the predicted future dropped calls and other network problems in identified geographical areas (i.e., predicted call drop zones 575) are on only data functionality, not voice functionality. In such a situation, the system initiates inter-carrier hand-off to another carrier or roaming partner only on the data carrier network, but not the voice carrier network. In still other embodiments of the system and method for predictive inter-carrier hand-off, the predicted future dropped calls and other network problems in identified geographical areas (i.e., predicted call drop zones 575) are on both voice functionality and data functionality. In such a situation, the system initiates an inter-carrier hand-off to another carrier or roaming partner on the voice carrier network and on the data carrier network.

Referring now to another aspect of the system and method for predictive inter-carrier hand-off, as has been described above, the machine learning model analyzes user data regarding dropped calls and other network problems in identified geographical areas. In some embodiments, the dropped calls may be identified as a repetitive problem in a first group of geographical areas, while other network problems such as poor reception are not identified as a repetitive problem in the first group of geographical areas. Additionally, the dropped calls may not be identified as a repetitive problem in a second group of geographical areas, while other network problems such as poor reception are identified as a repetitive problem in the second group of geographical areas.

Accordingly, in some implementations the system and method for predictive inter-carrier hand-off has to optimize or prioritize one type of service metric (e.g., dropped calls) over one or more other types of service metrics (e.g., poor reception, latency, or the like). In one or more such embodiments, the system is adjustable by the network carrier, the end users of the mobile device, or both regarding what service metric will be prioritized. In still another aspect, the system may use this same prioritization or optimization when determining if another carrier or roaming partner has superior service (for comparison prior to inter-carrier hand-off). For example, the superior service in the identified geographical areas may be optimized for one or more of availability, performance, or never dropping a call of the end user mobile device.

Notably, in some embodiments the primary data relied upon by the network to determine which network carrier has superior performance is not signal strength, since there may be other issues that lead to dropped calls or poor network performance other than signal strength. Nevertheless, in other embodiments, signal strength is still the primary data relied upon by the network to determine which network carrier has superior performance.

Embodiments of the system and method for predictive inter-carrier hand-off have been described above that implement a machine learning model. While many embodiments of the system and method for predictive inter-carrier hand-off implement a machine learning model, other embodiments of the system and method for predictive inter-carrier hand-off do not employ a machine learning model, but rather utilize more traditional analysis (i.e., non-machine learning). They may be several technical reasons to implement traditional, non-machine learning, analysis, including by way of example only, and not by way of limitation: lack of sufficient computation power available, an insufficient amount of data to properly train a machine learning model, lack of authorization to use the data in a machine learning model (e.g., potentially due to contractual or privacy issues), or the like. Thus, the predicted call drop zones 575 may be identified using other types of analysis (i.e., non-machine learning) of the user data in one or more embodiments of the system and method for predictive inter-carrier hand-off.

Figure 6:
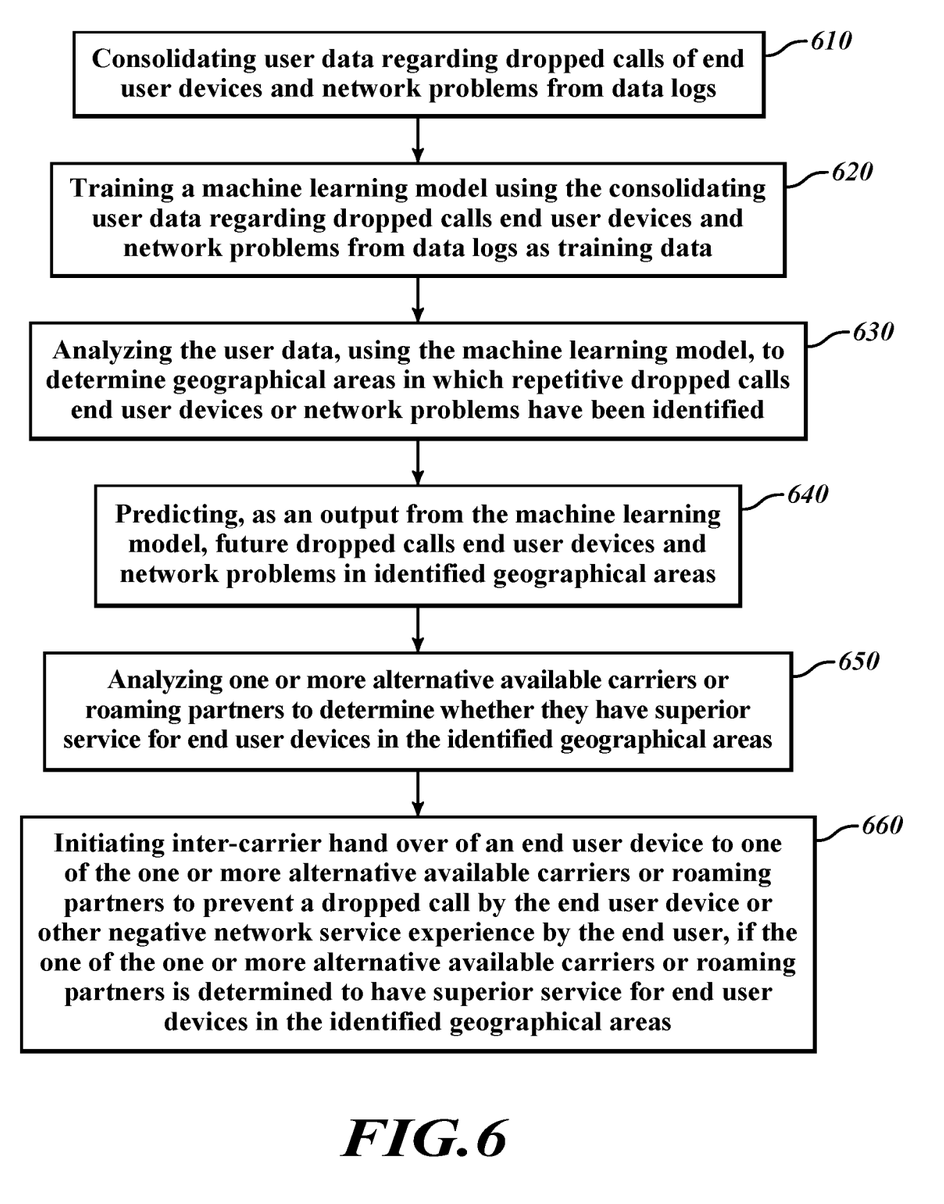
FIG. 6 is a logic diagram showing number sequencing data flow between certain telecommunication network components during predictive inter-carrier hand-off to mitigate problematic coverage areas.

FIG. 6 is a logic diagram showing a system for predictive inter-carrier hand-off to mitigate problematic coverage areas. As shown in FIG. 6, at operation 610, user data is consolidated regarding dropped calls of end user mobile devices and network problems from data logs. At operation 620, a machine learning model is trained using the consolidating user data regarding dropped calls of the end user mobile devices and network problems from data logs as training data. At operation 630, the user data is analyzed, using the machine learning model, to determine geographical areas in which repetitive dropped calls of the end user mobile devices or network problems have been identified. At operation 640, future dropped calls of the end user mobile devices and network problems in identified geographical areas are predicted as an output from the machine learning model. At operation 650, one or more alternative available carriers or roaming partners are analyzed to determine whether they have superior service for end user mobile devices in the identified geographical areas. At operation 660, inter-carrier hand-off of an end user mobile device is initiated to one of the one or more alternative available carriers or roaming partners to prevent a dropped call by the end user mobile device or other negative network service experience by the end user. In some embodiments, this inter-carrier hand-off only occurs if the one of the one or more alternative available carriers or roaming partners is determined to have superior service for end user mobile devices in the identified geographical areas. In other embodiments, this comparison analysis is not included.

Some embodiments of 5G New Radio (NR) include a feature known as bandwidth parts (BWPs). A Bandwidth Part (BWP) is a contiguous set of physical resource blocks (PRBs) on a given carrier. These resource blocks are selected from a contiguous subset of the common resource blocks. Typically, in a 5G environment, the entire available bandwidth is very large so the band may be broken up into parts for use by certain devices. For this reason, Bandwidth Parts may sometime be referred to as RAN slicing. Bandwidth Parts enables more flexibility in how resources are assigned in a given carrier. Specifically, multiple, different signal types may be sent in a given bandwidth. Most 5G Base Stations can utilize the wider bandwidths that are available in 5G. However, most 5G end user mobile devices are not able to use the larger available bandwidths supported by the 5G Base Stations. Bandwidth Parts enable multiplexing of different signals and signal types for better utilization of the spectrum and improved power utilization by the 5G end user mobile devices.

Orthogonal Frequency Division Multiplexing (OFDM) is a modulation format that may be implemented for 5G New Radio in some embodiments. OFDM is an efficient modulation format used in modern wireless communication systems including 5G. OFDM combines the benefits of Quadrature Amplitude Modulation (QAM) and Frequency Division Multiplexing (FDM) to produce a high-data-rate communication system. By employing the OFDM modulation format, bandlimited orthogonal signals can be combined while avoiding interchannel interference. Notably, OFDM is enabled by the use of the Inverse Fast Fourier Transform (IFFT) to efficiently create the time domain waveform from the array of modulated subcarriers.

In some embodiments of a system for predictive inter-carrier hand-off to mitigate problematic coverage areas, each individual end user mobile device 422, 424, 426, 432, 434, 436, 442, 444, 446, 452, 454, 456, 462, 464, and 466 is associated with its associated 5G Core 420, 430, 440, 450, and 460 using an IMSI (International Mobile Subscriber Identifier) number. An IMSI is a unique number associated with Global System for Mobile Communications (GSM) and Universal Mobile Telecommunications System (UMTS) network mobile phone users. As such, the IMSI is a unique number that identifies a mobile end user that is a subscriber to the carrier network.

In another aspect of some embodiments, a mobile subscriber of each individual end user mobile device is identified by its SIM (Subscriber Identity Module) card. A SIM card is a smart card inside a mobile phone that includes an identification number that is unique to the owner of the end user mobile device. The SIM card may store personal data and prevent operation if it is removed. The SIM card may also include an authentication key that is used to authenticate the owner of the end user mobile device. Additionally, the SIM card includes a processor, memory, and security circuits.

Figure 7:
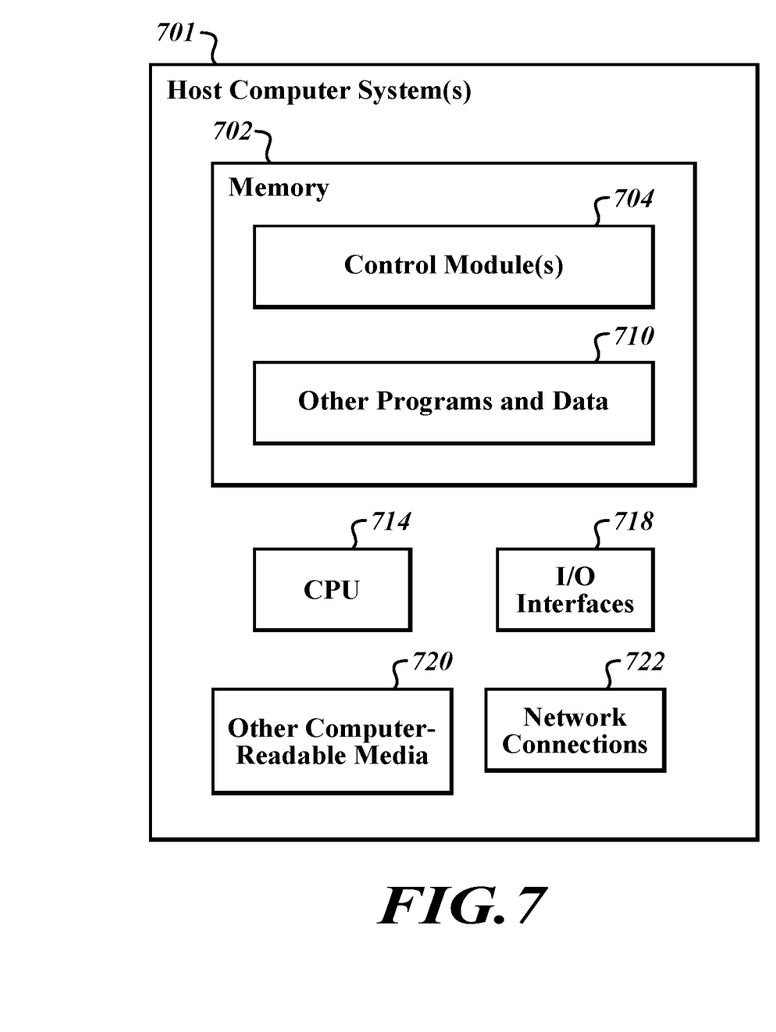
FIG. 7 shows a system diagram that describes an example implementation of a computing system(s) for implementing embodiments described herein.

FIG. 7 shows a system diagram that describes an example implementation of a computing system(s) for implementing embodiments described herein. The functionality described herein for a system for predictive inter-carrier hand-off to mitigate problematic coverage areas, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility.

In particular, shown is example host computer system(s) 701. For example, such computer system(s) 701 may represent those in various data centers and cell sites shown and/or described herein that host the functions, components, microservices and other aspects described herein to implement a system for predictive inter-carrier hand-off to mitigate problematic coverage areas. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for a system for predictive inter-carrier hand-off to mitigate problematic coverage areas. Memory 702 may also store other programs and data 710, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include a video interface, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for predictive inter-carrier hand-off to mitigate problematic coverage areas, the method comprising:
   providing, by a mobile network operator, a distributed unit (DU) of a fifth-generation (5G) cellular telecommunication network radio access network (RAN) that is served by a particular 5G cellular site base station, wherein the DU:
- is associated with a primary 5G Node B (gNB) identified by a primary identifier (ID), wherein the primary gNB are a distributed collection of base stations; and
- is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID;

consolidating user data regarding dropped calls of end user mobile devices and network problems from data logs;

training a machine learning model using the consolidating user data regarding dropped calls of the end user mobile devices and network problems from data logs as training data;

analyzing the user data, using the machine learning model, to determine geographical areas in which repetitive dropped calls of the end user mobile devices or network problems have been identified;

predicting, as an output from the machine learning model, future dropped calls of the end user mobile devices and network problems in identified geographical areas;

analyzing one or more alternative available carriers or roaming partners to determine whether they have superior service for end user mobile devices in the identified geographical areas, wherein the superior service is defined as being optimized for one or more of availability, performance, or not dropping calls of the end user mobile device; and initiating inter-carrier hand-off of an end user mobile device to one of the one or more alternative available carriers or roaming partners to prevent a dropped call by the end user mobile device or other negative network service experience by the end user, if the one of the one or more alternative available carriers or roaming partners is determined to have superior service for the end user mobile devices in the identified geographical areas.

2. The method of claim 1 further comprising analyzing the user data, using the machine learning model, to determine geographical areas, times of day, network load, and device characteristics in which repetitive dropped calls of the end user mobile devices and network problems have been identified.

3. The method of claim 1, wherein the geographical areas in which the inter-carrier hand-off is initiated includes geographical areas at least partially away from edges of the network carrier coverage.

4. The method of claim 1, wherein the consolidated user data is continuously updated with new data regarding dropped calls of the end user mobile devices and network problems, and wherein the training of the machine learning model is continuously updated with the new data regarding dropped calls and network problem.

5. The method of claim 1, wherein the predicted future dropped calls and network problems in identified geographical areas are on only one of voice service and data service, and wherein the initiating of inter-carrier hand-off to another carrier or roaming partner is only on one of voice service and data service, and the other of voice service and data service remains with an initial carrier.

6. The method of claim 1, wherein the superior service in the identified geographical areas is optimized for one or more of availability, performance, or never dropping a call of the end user mobile device.

7. The method of claim 1, wherein primary data relied upon to determine which network carrier has superior performance is not signal strength, wherein the primary data is the consolidated user data regarding dropped calls of end user mobile devices and network problems from data logs.

8. The method of claim 1, wherein the end user mobile device uses a dual Subscriber Identity Module (SIM), dual standby configuration that enables the inter-carrier hand-off of an end user mobile device to be from the network carrier of the first SIM to the network carrier of the second SIM.

9. The method of claim 1, further comprising enabling the end user mobile device to initiate the network carrier hand-off from the initial network carrier.

10. The method of claim 1, wherein the consolidated user data includes service calls from users and customer complaints for users.

11. A system for predictive inter-carrier hand-off to mitigate problematic coverage areas, the system comprising:
- a memory that stores computer executable instructions; and
- a processor that executes the computer-executable instructions that cause the processor to:
  - provide, by a mobile network operator, a distributed unit (DU) of a fifth-generation (5G) cellular telecommunication network radio access network (RAN) that is served by a particular 5G cellular site base station, wherein the DU:
    - is associated with a primary 5G Node B (gNB) identified by a primary identifier (ID); and
    - is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID;
  - consolidate user data regarding dropped calls of end user mobile devices and network problems from data logs;
  - train a machine learning model using the consolidating user data regarding dropped calls of the end user mobile devices and network problems from data logs as training data;
  - analyze the user data, using the machine learning model, to determine geographical areas in which repetitive dropped calls of the end user mobile devices or network problems have been identified;
  - predict, as an output from the machine learning model, future dropped calls of the end user mobile devices and network problems in identified geographical areas;
  - analyze one or more alternative available carriers or roaming partners to determine whether they have superior service for end user mobile devices in the identified geographical areas, wherein the superior service is defined as being optimized for one or more of availability, performance, or not dropping calls of the end user mobile device; and
  - initiate inter-carrier hand-off of an end user mobile device to one of the one or more alternative available carriers or roaming partners to prevent a dropped call by the end user mobile device or other negative network service experience by the end user, if the one of the one or more alternative available carriers or roaming partners is determined to have superior service for the end user mobile devices in the identified geographical areas.

12. The system of claim 11, wherein the processor that executes the computer-executable instructions further causes the processor to: analyze the user data, using the machine learning model, to determine geographical areas, times of day, network load, and device characteristics in which repetitive dropped calls of the end user mobile devices and network problems have been identified.

13. The system of claim 11, wherein the geographical areas in which the inter-carrier hand-off is initiated includes geographical areas at least partially away from edges of the network carrier coverage.

14. The system of claim 11, wherein the consolidated user data is continuously updated with new data regarding dropped calls of the end user mobile devices and network problems, and wherein the training of the machine learning model is continuously updated with the new data regarding dropped calls and network problem.

15. The system of claim 11, wherein the predicted future dropped calls and network problems in identified geographical areas are on only one of voice service and data service, and wherein the initiating of inter-carrier hand-off to another carrier or roaming partner is only on one of voice service and data service, and the other of voice service and data service remains with the initial carrier.

16. The system of claim 11, wherein the superior service in the identified geographical areas is optimized for one or more of availability, performance, or never dropping a call of the end user mobile device.

17. The system of claim 11, wherein primary data relied upon to determine which network carrier has superior performance is not signal strength, wherein the primary data is the consolidated user data regarding dropped calls of end user mobile devices and network problems from data logs.

18. The system of claim 11, wherein the end user mobile device uses a dual Subscriber Identity Module (SIM), dual standby configuration that enables the inter-carrier hand-off of an end user mobile device to be from the network carrier of the first SIM to the network carrier of the second SIM.

19. The system of claim 11, wherein the processor that executes the computer-executable instructions further causes the processor to enable the end user mobile device to initiate the network carrier hand-off from an initial network carrier.

20. A non-transitory computer-readable storage medium having computer-executable instructions stored thereon that, when executed by a processor, cause the processor to:
consolidate user data regarding dropped calls of end user mobile devices and network problems from data logs;
train a machine learning model using the consolidating user data regarding dropped calls of the end user mobile devices and network problems from data logs as training data;
analyze the user data, using the machine learning model, to determine geographical areas in which repetitive dropped calls of the end user mobile devices or network problems have been identified;
predict, as an output from the machine learning model, future dropped calls of the end user mobile devices and network problems in identified geographical areas;
analyze one or more alternative available carriers or roaming partners to determine whether they have superior service for end user mobile devices in the identified geographical areas, wherein the superior service is defined as being optimized for one or more of availability, performance, or not dropping calls of the end user mobile device; and
initiate inter-carrier hand-off of an end user mobile device to one of the one or more alternative available carriers or roaming partners to prevent a dropped call by the end user mobile device or other negative network service experience by the end user, if the one of the one or more alternative available carriers or roaming partners is determined to have superior service for the end user mobile devices in the identified geographical areas.

\* \* \* \* \*